(No Model.)

H. C. LUTHER.
MANUFACTURE OF IMITATION STONE FOR JEWELRY.

No. 274,350. Patented Mar. 20, 1883.

Witnesses:
Israel Plummer
Socrates Scholfield

Inventor:
Henry C. Luther

UNITED STATES PATENT OFFICE.

HENRY C. LUTHER, OF PROVIDENCE, RHODE ISLAND.

MANUFACTURE OF IMITATION STONE FOR JEWELRY.

SPECIFICATION forming part of Letters Patent No. 274,350, dated March 20, 1883.

Application filed February 8, 1883. (No model.)

*To all whom it may concern:*

Be it known that I, HENRY C. LUTHER, of Providence, in the State of Rhode Island, have invented an Improvement in the Manufacture of Imitation Stone for Jewelry, of which the following is a specification.

My invention relates to an improvement in the manufacture of glass imitation stone adapted for the settings of jewelry and millinery ornaments; and it consists in a glass imitation stone having the fins or inequalities formed at the junction of the plunger and die removed by simply grinding the front surface of the stone, the back surface and edge remaining unground.

Figure 1:
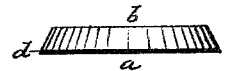
Figure 2:
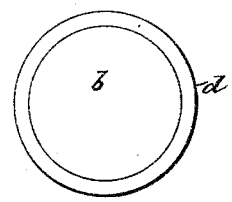
Figure 3:
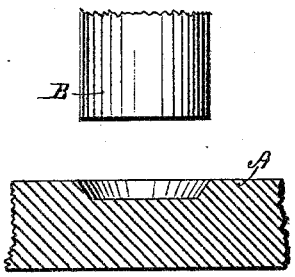
Figure 4:
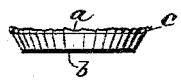
Figure 5:
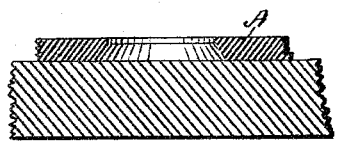
Figure 6:
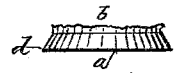

Figure 1 is an edge elevation of an imitation stone adapted for the settings of jewelry. Fig. 2 is a top view of the same. Fig. 3 represents the relative position of the die and plunger in the ordinary manufacture of such stone. Fig. 4 is an edge elevation of the imitation stone as removed from the die shown in Fig. 3. Fig. 5 represents the die and plunger as arranged to manufacture my improved imitation stone. Fig. 6 represents an edge elevation of the imitation stone as removed from the die shown in Fig. 5.

Heretofore in the manufacture of glass imitation stone for jewelry-settings by the process known as "pinching" the stone has been formed in a die, A, arranged in conjunction with a plunger, B, as shown in Fig. 3, leaving the fin $c$ and surplus stock at the back $a$ of the stone, as shown in Fig. 4, which necessitates the grinding of the back $a$, as well as the front $b$, in finishing the stone for the market. I have been able, however, by reversing the chamber of the die, as shown in Fig. 5, to pinch glass imitation stone, which may be properly finished for the market by grinding the surface at the front $b$ of the stone, and thus removing the surplus material, including the fin, by a single grinding operation, the back corner, $d$, remaining as received from the die, thus effecting an important saving in the expense of manufacturing such stone.

One great advantage of my improvement is the absolute uniformity of the setting edge or corner $d$ of the stone, which, when ground, is liable to variation, according to the skill and carefulness of the workman, but will be formed to a uniform size and angle in the die shown in Fig. 5.

I claim as my invention—

An imitation stone adapted for the settings of jewelry or millinery ornaments, and provided with a ground front surface, the back surface and the edge of the imitation stone remaining unground and free from the fins and enlargements caused by the contact of the plunger and die, as an improved article of manufacture.

HENRY C. LUTHER.

Witnesses:
D. B. POTTER,
S. SCHOLFIELD.